United States Patent
Hardegger et al.

(10) Patent No.: US 12,398,016 B2
(45) Date of Patent: Aug. 26, 2025

(54) STRAIN SENSOR FOR A POSITION MEASURING TAPE OF AN ELEVATOR

(71) Applicant: Cedes AG, Landquart (CH)

(72) Inventors: Martin Hardegger, Sargans (CH); Stefan Hagen, Malans (CH)

(73) Assignee: CEDES AG, Landquart (CH)

( * ) Notice: Subject to any disclaimer, the term of this patent is extended or adjusted under 35 U.S.C. 154(b) by 1290 days.

(21) Appl. No.: 17/120,627

(22) Filed: Dec. 14, 2020

(65) Prior Publication Data

US 2021/0188595 A1 Jun. 24, 2021

(30) Foreign Application Priority Data

Dec. 20, 2019 (EP) ..................................... 19219108

(51) Int. Cl.
*B66B 1/34* (2006.01)
*G01B 3/1003* (2020.01)

(52) U.S. Cl.
CPC .......... *B66B 1/3492* (2013.01); *G01B 3/1004* (2020.01)

(58) Field of Classification Search
CPC ............................ B66B 1/3492; G01B 3/1004
See application file for complete search history.

(56) References Cited

U.S. PATENT DOCUMENTS

| 4,427,095 A | | 1/1984 | Payne et al. | |
|---|---|---|---|---|
| 6,047,874 A | * | 4/2000 | Asai ....................... | B65H 20/32 226/110 |
| 9,306,623 B2 | * | 4/2016 | De Coi ................... | B66B 13/22 |
| 2003/0231421 A1 | * | 12/2003 | Tateishi ............... | G11B 15/602 |

FOREIGN PATENT DOCUMENTS

CN 108249245 A 7/2018

OTHER PUBLICATIONS

Guo et al. (CN 108249245 B) Grating Ruler Device for Detecting Position of an Elevator Cage and Mounting Method Thereof (Year: 2020).*
Leutenegger et al. (JP 2013010638 A) Elevator Equipment, Buildings, and Positioning Device (Year: 2013).*
De Coi Beat et al. (JP 2013230936 A) Elevator Installation, Measurement Apparatus, Marking Device and Guide Element (Year: 2013).*
Altenburger et al. (WO 2018234210 A1) Measuring Tape Support for a Lift System (Year: 2018).*
Extended European Search Report (Application No. 19219108.8) dated Jul. 10, 2020.

* cited by examiner

*Primary Examiner* — Jorge L Carrasquillo
(74) *Attorney, Agent, or Firm* — BURR PATENT LAW, PLLC

(57) ABSTRACT

Sensor apparatus for an elevator with a hanging position measuring tape for detecting a critical change in length of the position measuring tape comprising a carrier, comprising a carriage on the carrier, comprising a tape holder on the carriage, comprising a tensioning device between the carrier and the carriage in order to be able to tension a secured positioning tape, comprising a detection device for detecting a critical displacement of the carriage on the carrier on the basis of a critical change in length of a position measuring tape to be mounted, and comprising an adjusting device.

19 Claims, 3 Drawing Sheets

STRAIN SENSOR FOR A POSITION MEASURING TAPE OF AN ELEVATOR

This application claims the benefit under 35 USC § 119(a)-(d) of European Application No. 19 219 108.8 filed Dec. 20, 2019, the entirety of which is incorporated herein by reference.

FIELD OF THE INVENTION

The present invention relates to a sensor apparatus for an elevator with a hanging position measuring tape for detecting a critical change in length of the position measuring tape.

BACKGROUND OF THE INVENTION

Sensor apparatuses which detect that a position measuring tape has been torn off are known from the prior art, for example, from CN 108 249 245 A.

SUMMARY OF THE INVENTION

The object of the present invention is to provide an improved sensor apparatus.

The sensor apparatus according to the present invention is a sensor apparatus for an elevator with a hanging position measuring tape for detecting a critical change in length of the position measuring tape comprising a carrier with a mounting element for mounting the carrier on a stationary part of the elevator, comprising a carriage on the carrier, comprising a tape holder on the carriage with at least its securing element for securing the position measuring tape on the carriage in a fixed location and for roughly setting the length position of the position measuring tape, comprising a guide device between the carrier and the carriage with guide elements on the carrier and on the carriage for, in the parallel direction of the position measuring tape to be mounted, displaceably securing the carriage to the carrier, comprising a tensioning device between the carrier and the carriage with engagement elements on the carrier and the carriage and with a tensioning element which is secured to the engagement elements in order to move the carriage counter to the direction of the positioning tape to be secured and in order to be able to tension a secured positioning tape, comprising a detection device for detecting a critical displacement of the carriage on the carrier on the basis of a critical change in length of a position measuring tape to be mounted and for outputting a signal in the event of a detection with at least one activation element for identifying the position of a critical displacement and with a sensor for detecting the activation element in the event of a critical displacement, wherein the activation element and the sensor are alternately secured on the carrier and the carriage, and comprising an adjusting device in order to be able to set the distance between the at least one activation element and the sensor, with at least one adjusting element on the carriage and the tape holder for setting the position of the tape holder with respect to the carriage in a parallel direction of the position measuring tape to be mounted in order to be able to adjust the length position of a position measuring tape to be mounted with respect to the carriage, or on the carrier and the carriage for setting the distance between the activation element and the sensor.

The sensor apparatus can create the advantage that a critical change in length of a mounted position measuring tape can be detected.

To this end, the sensor apparatus according to the present invention can be intended to be secured to the floor or in a lower region of an elevator shaft and to receive a position measuring tape which is fastened to the ceiling or an upper region of the elevator shaft and hangs downward, to tension the position measuring tape and to detect a critical change in length of the position measuring tape.

The position measuring tape can have a large number of position codes. The position measuring tape can be provided for the purpose of determining the vertical position of an elevator car in the elevator shaft. To this end, the elevator car can have a further sensor apparatus which detects the position codes of the position measuring tape.

A change in length of the position measuring tape can be caused by a change in temperature, aging or else a fracture in the position measuring tape. A change in length is critical if it exceeds a specific threshold value. The threshold value can be selected such that a change in length can still be compensated for and processed by the position measuring system without faults without the threshold value being exceeded.

The detection device preferably comprises a first activation element which identifies the position of the carriage in the event of a critical extension of a position measuring tape to be mounted and a second activation element which identifies the position of the carriage in the event of a critical shortening of a position measuring tape to be mounted.

This can create the advantage that a critical change in length can be detected in both directions.

The sensor apparatus preferably has a marking element on the carrier or carriage in order to be able to set the distance between the at least one activation element and the sensor to a specific critical distance which corresponds to a critical change in length of a position measuring tape to be measured and, in particular, in the case of two activation elements, in order to be able to set the sensor to a central position between the two activation elements.

This can create the advantage that the adjustment of the sensor apparatus can be performed in a simple manner and, in particular, can be prespecified in a standardized manner.

The tensioning device preferably forms a first setting device and the adjusting device preferably forms a second setting device, in each case for changing the position of the position measuring tape to be mounted with respect to the detection device, in particular, with respect to the activation elements or to the sensor.

This can create the advantage that the adjustment can first be performed roughly and then I more finely. This can simplify the adjustment process.

The sensor apparatus preferably provides the securing of a position measuring tape composed of metal, in particular, a steel tape, which has, in particular, a sequence of optical 2D codes.

A critical change in length of the position measuring tape preferably corresponds to an extension or a shortening which exceeds a specific different threshold values or a common threshold value.

The direction of the position measuring tape to be mounted preferably corresponds to the direction toward its upper end and the parallel direction of the position measuring tape to be mounted preferably corresponds to the parallel in its direction and its opposite direction.

This can create the advantage that the sensor apparatus is matched to the position measuring tape in an optimum manner.

The mounting element of the carrier is preferably a screw hole. The carrier is preferably intended for mounting at the lower end of the elevator, in particular, on the floor of the elevator.

This can create the advantage that the position measuring tape is completely monitored.

The at least one securing element of the tape holder preferably provides two recesses in the tape holder for threading in the position measuring tape. This can create the advantage that the position measuring tape can be secured to the tape holder in a simple manner.

The position measuring tape is preferably intended for securing at its lower end. This can create the advantage that the entire position measuring tape is monitored.

The tape holder is preferably secured to the carriage in a fixed location. This can create the advantage that a critical change in length can be precisely detected.

The rough setting of the length position of the position measuring tape on the securing element of the tape holder the length position of the position measuring tape with respect to the carriage and the carrier is preferably made in the parallel direction of the position measuring tape. This can create the advantage that rough adjustment can be performed as early as when the position measuring tape is secured to the tape holder.

The guide elements of the guide device preferably have slots and support areas in the carrier and lugs and runners in the carriage, wherein the lugs engage into the slots for guiding purposes and the runners slide on the support areas for guiding purposes.

This can create the advantage that the carriage is guided in a displaceable manner in the parallel direction of the position measuring tape.

The engagement elements of the tensioning device are preferably eyes. The tensioning element of the tensioning device is preferably a spring which has hook elements which are hooked into the engagement elements of the tensioning device.

This can create the advantage that the position measuring tape remains tensioned and a change in length of the position measuring tape leads directly to a movement the carriage.

The activation elements of the detection device are preferably button elements, in particular, ramp elements, and the sensor is a tactile sensor which is activated by the ramp elements in the event of a critical displacement of the carriage. The critical displacement of the carriage is preferably effected by a critical change in length of a the position measuring tape to be mounted.

This can create the advantage that the detection of a critical change in length is performed in a simple manner. This can further create the advantage that the functioning of the sensor apparatus can be performed in a simple manner by visual inspection.

The adjusting elements of the adjusting device preferably have a row of holes in the tape holder, two threaded bores in the carriage and two associated screws, wherein different holes of the row of holes can be selectively chosen in order to secure the tape holder to the carriage by means of the screws in the threaded bores of the carriage.

This can create the advantage that the securing of the position measuring tape can be adjusted in a stepped manner with respect to the carriage. This can create the advantage that the detection device can be adjusted in a stepped manner.

The sensor apparatus preferably has a protective element for providing screening in the direction of the position measuring tape to be mounted, in particular, an extensive projection at that end of the carrier that is situated in the direction of the position measuring tape to be mounted, in order to divert away objects which may fall in from the direction of the upper end of the position measuring tape before they hit the carriage.

This can increase the operational reliability of the sensor device.

The elevator according to the present invention is an elevator comprising a sensor apparatus of the abovementioned type. The elevator can create the abovementioned advantages.

Further features of the present invention are indicated in the drawings.

The advantages mentioned in each case can also be implemented for combinations of features in the context of which they have not been mentioned.

BRIEF DESCRIPTION OF THE DRAWINGS

Exemplary embodiments of the present invention are illustrated in the drawings and will be explained in more detail hereinbelow. Like reference signs in the individual figures here denote corresponding elements.

All the figures show the exact same sensor device in a view which is true to proportions.

DETAILED DESCRIPTION OF THE INVENTION

Figure 1:
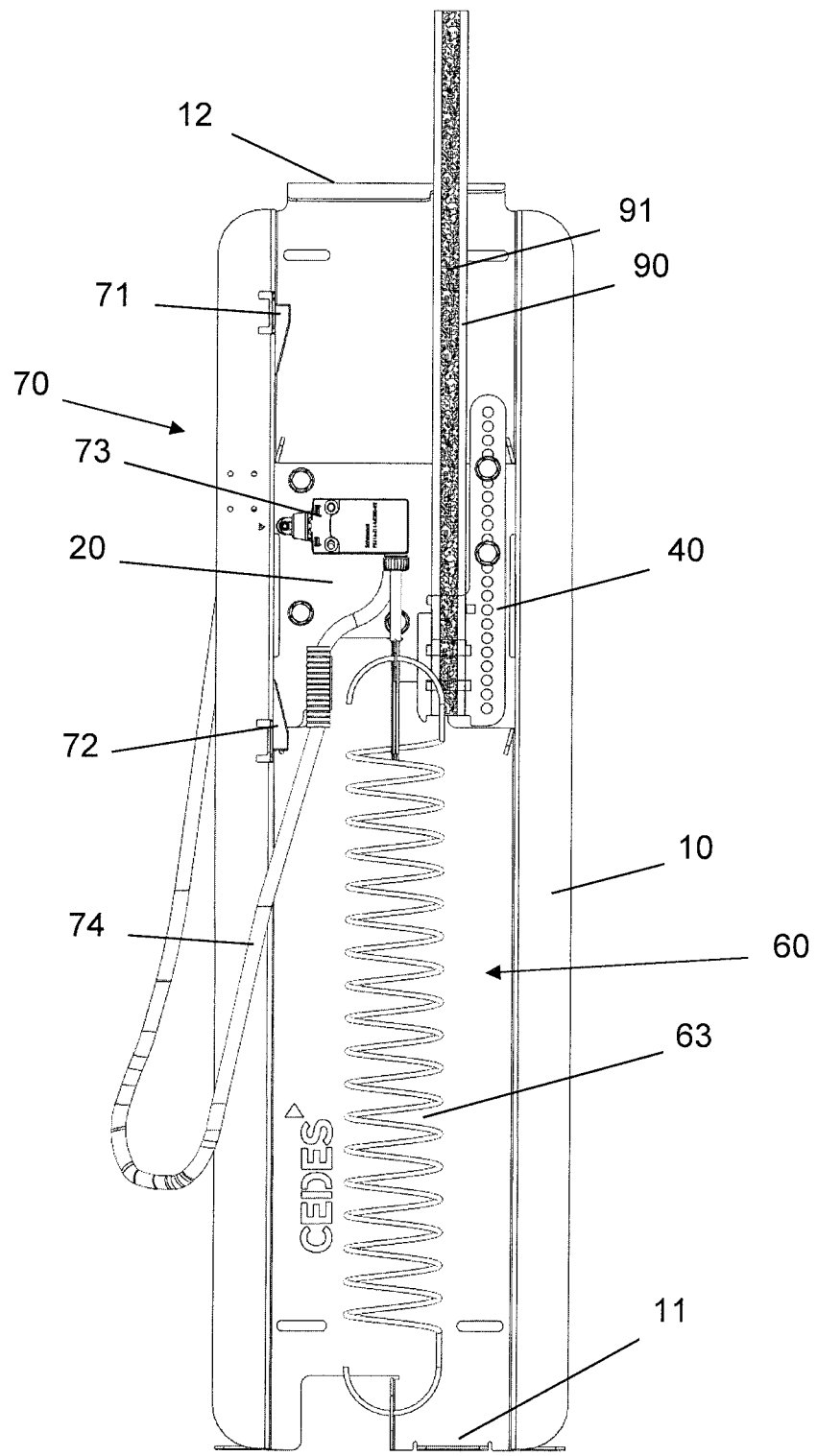
FIG. 1 shows a side view of the sensor device from the front.

FIG. 1 shows the carrier 10, the carriage 20, the tape holder 30, the tensioning device 60 with the spring 63, the detection device 70 with the upper ramp 71 and the lower ramp 72 on the carrier 10, with the tactile sensor 73 on the carriage 20 and with the signal line 74 which is connected to the tactile sensor 73, and also the position measuring tape 90 with a large number of 2D position codes 91.

In an extension of a position measuring tape that is suspended in the upper end of the elevator shaft, the sensor device is secured by way of the screw hole 11 to the floor of the elevator shaft by means of a screw. Therefore, the orientation of the figures with respect to the top and bottom is realistic. The carrier 11 has, at the upper end, a deflection plate 12 as a protection element against falling objects.

Figure 2:
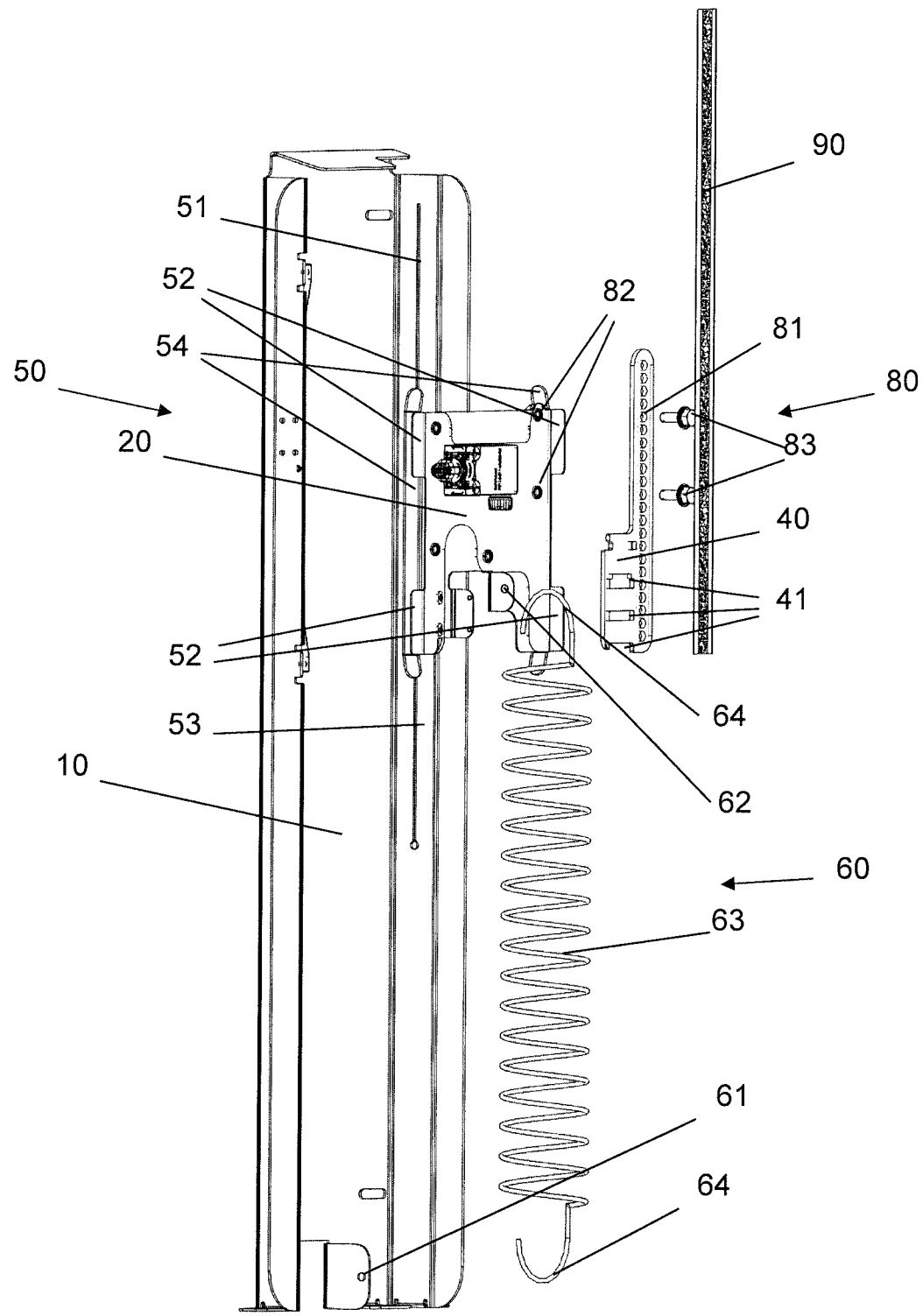
FIG. 2 shows a perspective exploded view of the sensor device.

FIG. 2 shows, in the individual parts, the carrier 10, the carriage 20, the spring 63, the tape holder 40 with its recesses 41, and the position measuring tape 90.

During operation, the spring 63, by way of its two hook elements 64, is hooked into the eye 61 of the carrier 10 and the eye 62 of the carriage 20 and in this way pulls the carriage downward.

During operation, the position measuring tape 90 is threaded into the recesses 41 of the tape holder 40 such that the position measuring tape is non-positively fixedly secured to the tape holder when it is under tension. During threading of the position measuring tape into the recesses 41, the position of the position measuring tape with respect to the tape holder 40 and, during operation, also with respect to the carriage can be roughly adjusted.

The adjusting device 80 has, on the tape holder 40, a row of holes 81 through which two screws 83 can be inserted during operation, the screws being screwed into the screw holes 82 of the carriage 20. Therefore, the position measuring tape is fixedly secured to the carriage during operation. The position of the position measuring tape 90 with respect to the carriage can be finely adjusted by choosing the holes of the row of holes that are used for the screws.

The guide device 50 has four lugs 52 on the carriage, which lugs engage into the two slots 51 of the carrier 10, and also two runners 54 on the carriage, which runners slide on the two support areas 53 of the carrier. By way of these elements, the carriage is positively guided in a one-dimensionally displaceable manner in the parallel direction of the position measuring tape to be mounted. Therefore, the carriage can move along with the end of the position measuring tape in the event of a change in length of the position measuring tape by displacement of its position in the carrier.

Figure 3:
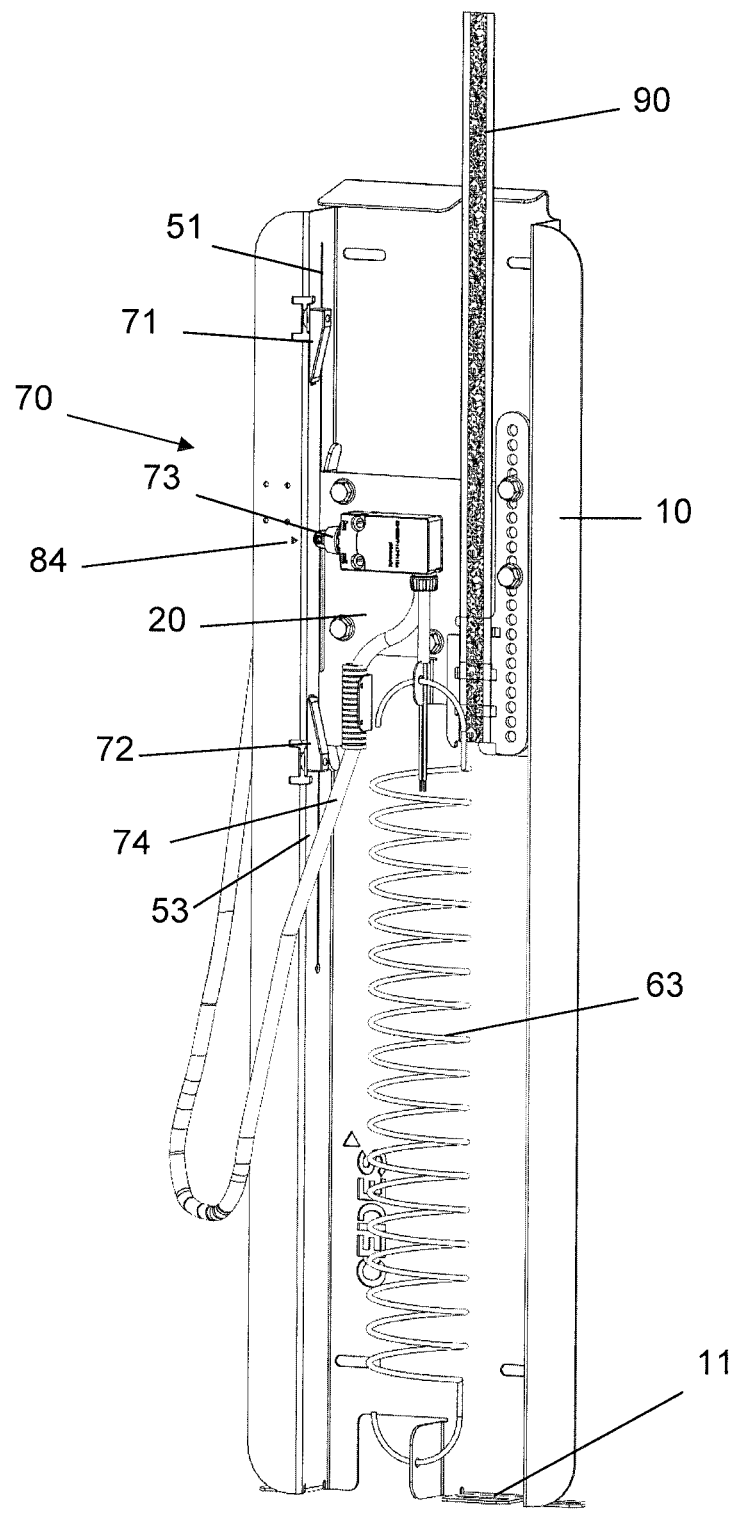
FIG. 3 shows a perspective side view of the sensor device from the right.

FIG. 3 shows the detection device 70 has a tactile sensor 73 which is fixedly secured to the carriage 20 and also the upper ramp 71 and the lower ramp 72 on the carrier 10. The tactile sensor is connected to the elevator control system via the signal line 74.

FIG. 3 shows an upper ramp 71 and the lower ramp 72 the tactile sensor 73, and also the marking element 84 on the carrier. The marking element 84 is fitted such that, when the sensor device is adjusted in such a way that the tactile sensor is situated exactly opposite the marking element, the two distances of the tactile sensor from the upper and from the lower button element are of the same length. These distances represent the length of the permitted critical change in length of the position measuring tape.

The adjustment is performed in such a way that the position of the carriage with respect to the hanging-down end of the position measuring tape is selected with the aid of the adjusting device such that the sensor is positioned level with the marking. Therefore, the sensor apparatus is designed such that the same critical distances are detected both for an extension and also for a shortening of the position measuring tape. This is the initial operating state of the sensor apparatus as depicted in FIG. 1 and FIG. 3.

If the position measuring tape 90 is now shortened by more than a critical change in length, the position measuring tape pulls the carriage 20 together with the tactile sensor 73 upward against the force of the spring 63 as far as the upper ramp 71, so that the upper ramp 71 pushes in the sensing finger of the tactile sensor 73. In the process, the tactile sensor 73 sends a signal via the signal line 74 to the elevator control system which is to be connected to the signal line and said elevator control system can initiate, for example, emergency stopping of the elevator.

If the position measuring tape now extends by more than a critical change in length after the initial operating state of the sensor apparatus, the spring 63 pulls the carriage 20 together with the tactile sensor 73 downward as far as the lower ramp 72, so that the lower ramp 72 pushes in the tactile sensor 73. In the process, the tactile sensor 73 sends a signal via the signal line 74 to the elevator control system which is to be connected to the signal line and the elevator control system can initiate, for example, emergency stopping of the elevator.

LIST OF REFERENCE SIGNS

10 Carrier
11 Screw hole
12 Deflection plate
20 Carriage
40 Tape holder
41 Recesses
50 Guide device
51 Slots
52 Lugs
53 Support area
54 Runners
60 Tensioning device
61 Eye
62 Eye
63 Spring
64 Hook element
70 Detection device
71 Upper ramp
72 Lower ramp
73 Tactile sensor
74 Signal line
80 Adjusting device
81 Row of holes
82 Screw holes
83 Screws
84 Marking element
90 Position measuring tape
91 2D position codes

The invention claimed is:

1. A sensor apparatus for an elevator with a hanging position measuring tape for detecting a critical change in length of the position measuring tape comprising:

a carrier with a mounting element for mounting the carrier on a stationary part of the elevator, the carrier comprising a carriage and a tape holder on the carriage with at least one securing element for securing the position measuring tape in a fixed location and for roughly setting the length position of the position measuring tape, a guide device between the carrier and the carriage with guide elements on the carrier and on the carriage for, in the parallel direction of the position measuring tape to be mounted, displaceably securing the carriage to the carrier, a tensioning device between the carrier and the carriage with engagement elements on the carrier and the carriage and with a tensioning element which is secured to the engagement elements in order to move the carriage counter to the direction of the positioning tape to be secured and in order to be able to tension a secured positioning tape, a detection device for detecting a critical displacement of the carriage on the carrier on the basis of a critical change in length of a position measuring tape to be mounted and for outputting a signal in the event of a detection, with at least one activation element for identifying the position of a critical displacement and with a sensor for detecting the activation element in the event of a critical displacement, wherein the activation element and the sensor are alternately secured on the carrier and the carriage, and an adjusting device provided in order to be able to set the distance between the at least one activation element and the sensor, with at least one adjusting element on the carriage and the tape holder for setting the position of the tape holder with respect to the carriage in a parallel direction of the position measuring tape to be mounted in order to be able to adjust the length position of a position measuring tape to be mounted with respect to the carriage, or on the carrier and the carriage for setting the distance between the at least one activation element and the sensor.

2. The sensor apparatus according to claim 1, wherein the detection device comprises a first activation element which identifies the position of the carriage in the event of a critical extension of a position measuring tape to be mounted and comprises a second activation element which identifies the position of the carriage) in the event of a critical shortening of a position measuring tape to be mounted.

3. The sensor apparatus according to claim 1, further comprising a marking element on the carrier or carriage in order to be able to set the distance between the activation element and the sensor to a specific critical distance which corresponds to a critical change in length of a position measuring tape to be measured.

4. The sensor apparatus according to claim 3, comprising two activation elements in order to be able to set the sensor to a central position between the two activation elements.

5. The sensor apparatus according to claim 1, wherein the tensioning device forms a first setting device and the adjusting device forms a second setting device, in each case for changing the position of the position measuring tape to be mounted with respect to the detection device.

6. The sensor apparatus according to claim 5, wherein the tensioning device forms a first setting device and the adjusting device forms a second setting device for changing the position of the position measuring tape to be mounted with respect to the activation elements or to the sensor.

7. The sensor apparatus according to claim 1, wherein the sensor apparatus provides the securing of a position measuring tape composed of metal, which has a sequence of optical 2D codes and/or a critical change in length of the position measuring tape corresponds to an extension or a shortening which exceeds a specific different threshold values or a common threshold value and/or the direction of the position measuring tape to be mounted is the direction toward its upper end and the parallel direction of the position measuring tape to be mounted is the parallel in its direction and its opposite direction.

8. The sensor apparatus according to claim 7 wherein the position measuring tape is a steel tape.

9. The sensor apparatus according to claim 1, wherein the mounting element of the carrier is a screw hole and/or the carrier is intended for mounting on the lower end of the elevator.

10. The sensor apparatus according to claim 9, wherein the mounting element of the carrier is a screw hole and/or the carrier is intended for mounting on the floor of the elevator.

11. The sensor apparatus according to claim 1, wherein the at least one securing element of the tape holder provides two recesses for threading in the position measuring tape and/or the position measuring tape is intended for securing at its lower end and/or the tape holder is secured to the carriage in a fixed location and/or the rough setting of the length position of the position measuring tape on the securing element of the tape holder the length position of the position measuring tape with respect to the carriage and the carrier is made in the parallel direction of the position measuring tape.

12. The sensor apparatus according to claim 1, wherein the guide elements of the guide device have slots and support areas in the carrier and lugs and runners in the carriage, wherein the lugs engage into the slots for guiding purposes and the runners slide on the support areas for guiding purposes.

13. The sensor apparatus according to claim 1, wherein the engagement elements of the tensioning device are eyes and/or the tensioning element of the tensioning device is a spring which has hook elements which are hooked into the engagement elements of the tensioning device.

14. The sensor apparatus according to claim 1, wherein the activation elements of the detection device are button elements and the sensor is a tactile sensor which is activated by the ramp elements in the event of a critical displacement of the carriage and/or the critical displacement of the carriage is effected by a critical change in length of a the position measuring tape to be mounted.

15. The sensor apparatus according to claim 14, wherein the activation elements of the detection device are ramp elements.

16. The sensor apparatus according to claim 1, wherein the adjusting elements of the adjusting device have a row of holes in the tape holder, two threaded bores in the carriage and two associated screws, wherein different holes of the row of holes can be selectively chosen in order to secure the tape holder to the carriage by means of the screws in the threaded bores of the carriage.

17. The sensor apparatus according to claim 1, wherein the sensor apparatus has a protective element for providing screening in the direction of the position measuring tape to be mounted in order to divert away objects which may fall in from the direction of the upper end of the position measuring tape before they hit the carriage.

18. The sensor apparatus according to claim 17, wherein the sensor apparatus has a protective element for providing an extensive projection at that end of the carrier that is situated in the direction of the position measuring tape to be mounted in order to direct away objects which may fall in from the direction of the upper end of the position measuring tape before they hit the carriage.

19. An elevator comprising a sensor apparatus according to claim 1.

* * * * *